Oct. 23, 1962 R. J. BERNOTAS 3,059,792
CRADLE LOADER
Filed May 25, 1960 3 Sheets-Sheet 1

INVENTOR.
Ralph J. Bernotas
BY
G.E. McGlynn Jr.
ATTORNEY

Oct. 23, 1962   R. J. BERNOTAS   3,059,792
CRADLE LOADER

Filed May 25, 1960

INVENTOR.
Ralph J. Bernotas
BY
ATTORNEY

Oct. 23, 1962

R. J. BERNOTAS 3,059,792

CRADLE LOADER

Filed May 25, 1960

INVENTOR.
Ralph J. Bernotas
BY
ATTORNEY 3,059,792
CRADLE LOADER
Ralph J. Bernotas, South Euclid, Ohio, assignor to General Motors Corporation, Detroit, Mich., a corporation of Delaware
Filed May 25, 1960, Ser. No. 31,720
5 Claims. (Cl. 214—140)

The present invention relates to material handling vehicles and, in particular, to a vehicle including a digging, carrying and dumping bucket supported on the vehicle by a cradling mechanism which serves to increase the stability of the vehicle under static and dynamic conditions.

Conventional front end or shovel loaders typically comprise a bucket disposable in a digging position in front of the loader vehicle. Elevatable lift beams are pivotally connected on a horizontal transverse axis to the vehicle, and have their forward ends pivotally connected on a similar axis to the bucket structure. Suitable tilting linkage is operatively connected to the bucket to accomplish roll-back or break-away tilting movement of the bucket from a digging position to a low level load-retaining position. Thereafter, the lift beams may be elevated to dispose the bucket in a high-lift position for dumping the contents thereof such as into another vehicle, for example.

With particular reference to those aspects of the problems solved by the present invention, it may be noted that the initial cost and operating stability of such conventional front end loaders are drastically affected by such variables as the size of the bucket and therefore the load to be handled, the size and weight of the vehicle, and the size and rating of the vehicle power plant and other operating components thereof. For example, after a bucket of a given size is loaded and then lifted to some extent off the ground, it is supported cantilever fashion by the bucket support arms or beams a relatively great distance beyond or above, or both, the front axle of the vehicle. The weight of the load in the bucket establishes a moment force acting about the vehicle front axle as a fulcrum, and which force is resisted or counterbalanced by the weight of the vehicle acting on the rear axle. Therefore, given any particular bucket size or limited range of bucket sizes, it is necessary to make the basic vehicle large and heavy enough so as to provide a sufficient counterweight at the rear axle to resist the moment force of the loaded bucket thereby stabilizing the vehicle and preventing it from tipping about its front axle. Such considerations naturally lead to a large enough power plant having sufficient horsepower to move the vehicle with the loaded bucket.

If the loaded vehicle remains substantially stationary and loads from a stockpile into a truck or other receptacle, the problem of instability due to the moment of the bucket load is not quite so critical, although sufficient counterweight must be provided at the rear axle to stabilize the vehicle as the bucket is swung out and up to the high lift position for loading purposes as aforedescribed. It will be appreciated, however, that if such a loader vehicle is to be used primarily as a digging and transporting implement as in stockpiling work in quarry operations, the effect of the bucket load on vehicle stability is exaggerated due to dynamic loading resulting from the vehicle traversing relatively large distances over rough terrain and at relatively high speeds and, of course, due to inertia forces imposed on the vehicle by sharp turning or braking of the latter, for example.

It may be noted also that the aforementioned design considerations seriously limit the range of bucket sizes usable with a conventional loader of a particular design. In other words, a conventional front end loader vehicle designed to be equipped with a limited range of buckets beginning, for example, with one capable of carrying a one and one-half yard load will generally not be able to handle a six yard bucket load efficiently and with the necessary stability. Thus, in designing the vehicle for a bucket range beginning with the one and one-half yard bucket as aforementioned, a particular gross vehicle weight and a particular power plant is contemplated. However, when the larger 6 yard bucket is placed on the vehicle, it is generally necessary to place additional counterweight opposite the fulcrum point or front axle of the vehicle from the bucket to maintain the stability of the vehicle. Addition of this extra weight, which is substantial, results in a vehicle which is under-powered.

It is, therefore, a principal object and feature of this invention to overcome the disadvantages of prior art front end loaders as aforementioned by providing a loader vehicle comprising a material handling bucket and a cradling and support mechanism connecting the bucket to the vehicle, whereby the bucket and the load contained therein may be moved from a digging position to a cradled position to change substantially the moment force exerted by the bucket load about the vehicle front axle acting as a fulcrum so as to enhance vehicle stability.

It is another feature and object of this invention to provide a vehicle of the type aforedescribed with a cradle loader structure including a bucket, and means for moving the loaded bucket into a cradled position in which it is closer to the fulcrum portion of the vehicle ground-engaging means or front axle than when disposed in a digging or low level load-retaining position, thereby reducing the moment exerted by the bucket load about the fulcrum and reducing the effect of the inertia forces passing through the bucket.

It is another feature and object of this invention to provide a cradle loader vehicle comprising a bucket disposable in a digging position forwardly of a vehicle front axle which serves as a fulcrum, and cradle and support means associated with the bucket whereby the latter may be moved rearwardly and longitudinally toward the vehicle rear axle and relative to the fulcrum from a digging position to a cradled position in which stability of the vehicle about the fulcrum is improved.

More specifically, it is a feature and object of this invention to provide a cradle loader structure for a vehicle comprising a bucket disposable in a digging position forwardly of the vehicle front axle or fulcrum, and which bucket is connected to the vehicle by pivotal cradle lever means which may be swung in a relatively large arc to move the bucket longitudinally rearwardly from the digging position to a cradled position in which it is substantially immediately adjacent and above the vehicle front axle and below the horizontal line of sight of the vehicle operator.

It is yet another object and feature of this invention to provide a cradle loader of the type aforementioned with which a relatively great range of bucket sizes may be employed with the requisite vehicle stability whether the vehicle is operating at a relatively stationary location or is being utilized to transport loads at relatively high speeds over irregular terrain, and which stability results without the addition of counterweights to the vehicle.

These and other objects, features and advantages of this invention will appear more fully hereinafter as the description of the invention proceeds, and in which reference is made to the following drawings showing a preferred embodiment of the invention and in which.

Figure 1:
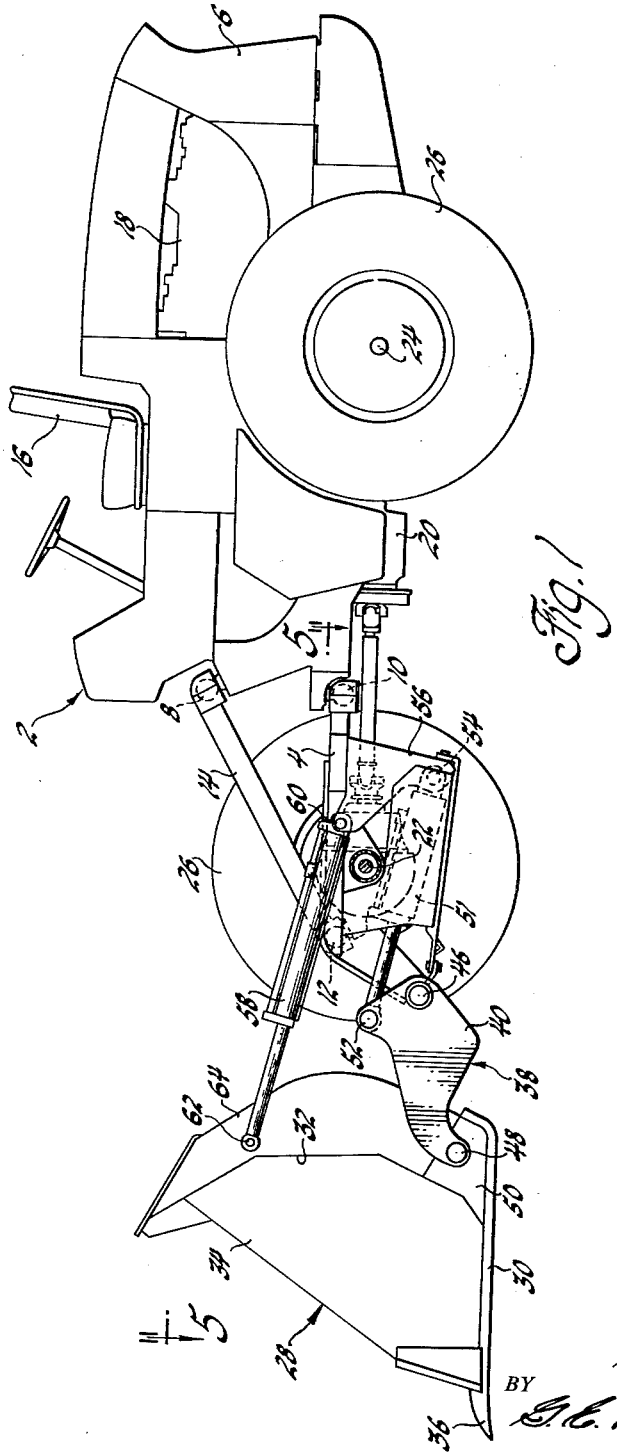
FIGURE 1 is a side elevation of a vehicle equipped with the material handling structure of this invention, the bucket thereof being disposed in a digging position.

Referring now to the drawings, and particularly FIGURE 1 thereof, there is shown a rubber-tired tractor 2 comprising a forward frame section 4 and a rear or main frame section 6 which are operatively connected by means of vertically aligned ball joints 8 and 10, the lowermost of which directly connects the adjacent ends of the frame sections while the uppermost joint 8 is connected to a similar joint 12 on the forward frame section by a compression link or torque brace 14. The joints 8 and 10 form a vertical axis about which the two frame sections are relatively articulable by suitable means (not shown) for steering, the joints 10 and 12 defining a horizontal longitudinally extending axis of relative frame oscillation to insure that diametrically opposite wheels cannot leave the ground simultaneously which would result in complete loss of drive by reason of the differential action in the front and rear drive axles. Mounted behind the vehicle operator's compartment 16 is a power plant 18 for transmitting drive through the transmission 20 to the front and rear drive axles 22 and 24, respectively which drive the ground-engaging rubber tires 26. For a more complete and detailed description of a vehicle of this type, reference may be made to my copending application, Serial No. 629,933, filed December 21, 1956. Although the cradle loader structure of this invention is preferably utilized on such a vehicle, it will be apparent as the description proceeds that such a structure may be used on other vehicles whether they be of the four wheel drive type shown in the drawings, or whether they have front and rear axles or other ground-engaging means such as crawler tracks.

The material handling bucket indicated generally at 28 is conventional in nature in that it comprises a transversely extending wall 30 joined to a curved transversely extending base portion 32 and the transversely spaced side walls 34. A suitable cutting edge 36 extends along the forward edge of the wall 30 for digging purposes. The bucket 28 is adapted to be mounted upon the front frame section 4 by a cradle lever support mechanism 38 now to be described. In this regard, and as will be apparent to those skilled in the art, it will be readily apparent that the various support and operating linkages to be described with respect to one side of the vehicle are duplicated on the other side thereof.

Figure 5:
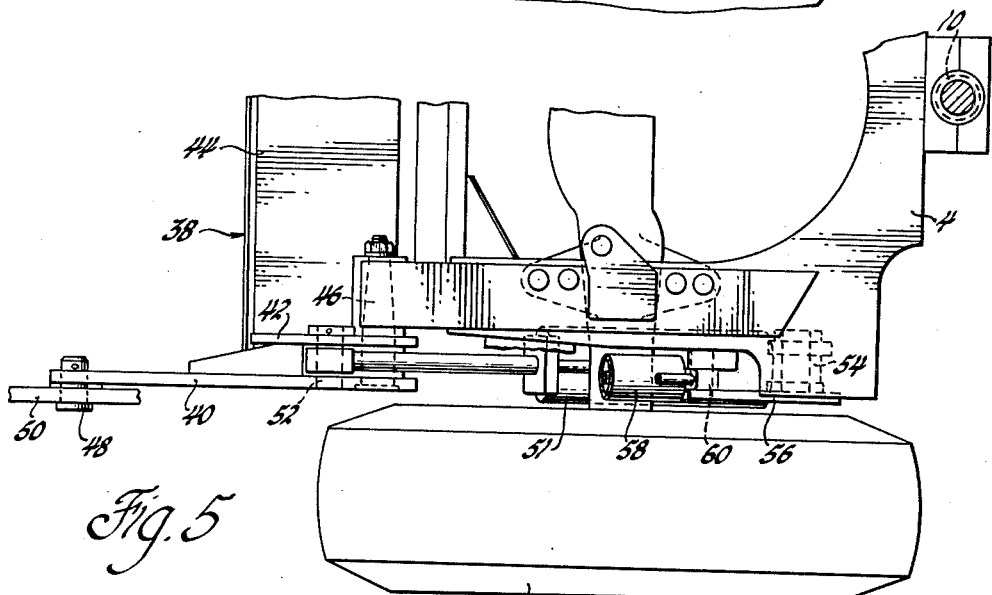
FIGURE 5 is a fragmentary view taken on the line 5—5 of FIGURE 1.

Referring particularly to FIGURE 5, the cradle lever mechanism indicated generally at 38 extends transversely of the front frame section 4, and is provided at its opposite ends with an outer cradle lever 40 generally of bell crank configuration cooperating with a laterally inwardly adjacent mounting plate 42. Each cradle lever 40 and the mounting plate or bracket 42 associated therewith are rigidly interconnected by means of the transversely extending reinforcing member 44, other reinforcing plates being provided as required. The cradle lever mechanism 38 is pivotally connected to the front frame section 4 on a fixed horizontally extending transverse axis forward of and below the front axle 22 by means of a pair of aligned pivot pins 46 extending through each cradle lever 40 and mounting bracket 42 and supported on the front frame structure 4.

The outer end of each of the cradle levers 40 is pivotally connected at 48 on a horizontal transverse axis to a mounting plate 50 rigidly secured to the bucket 28, while the cradle lever mechanism 38 is adapted to be pivoted about the axis of the pins 46 by means of the relatively extensible and retractable double-acting fluid pressure-operated jack 51 of the piston and cylinder type having the piston rod thereof pivotally connected at 52 to the cradle lever 40 and bracket 42 and the cylinder thereof pivotally connected at 54 to plate 56 rigidly secured to the front frame 4 and depending therefrom. A similar fluid pressure-operated jack of the piston and cylinder type is indicated at 58 and has the cylinder thereof pivotally connected at 60 to the plate 56, and the piston rod thereof pivotally connected at 62 to a bracket 64 on the bucket 28.

Figure 2:
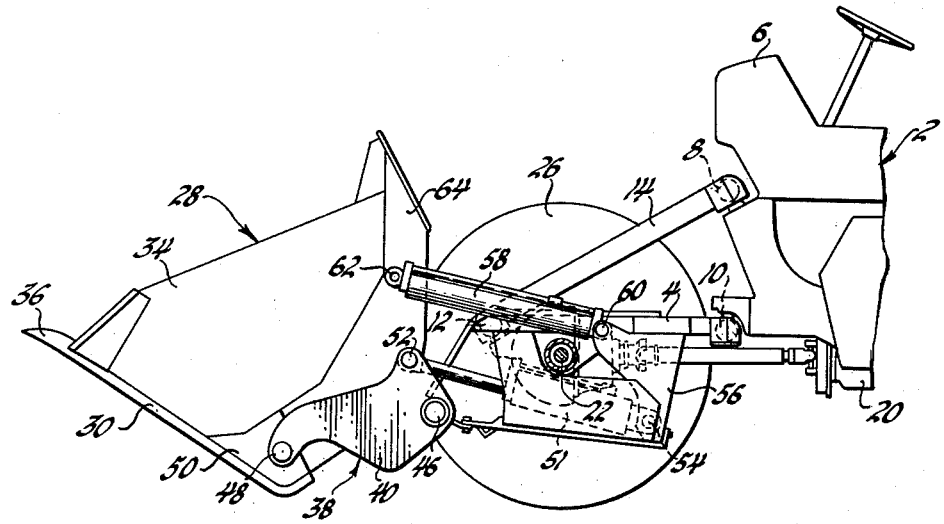
FIGURE 2 is a fragmentary view of FIGURE 1, but showing the bucket disposed in a low level load-retaining position.
Figure 3:
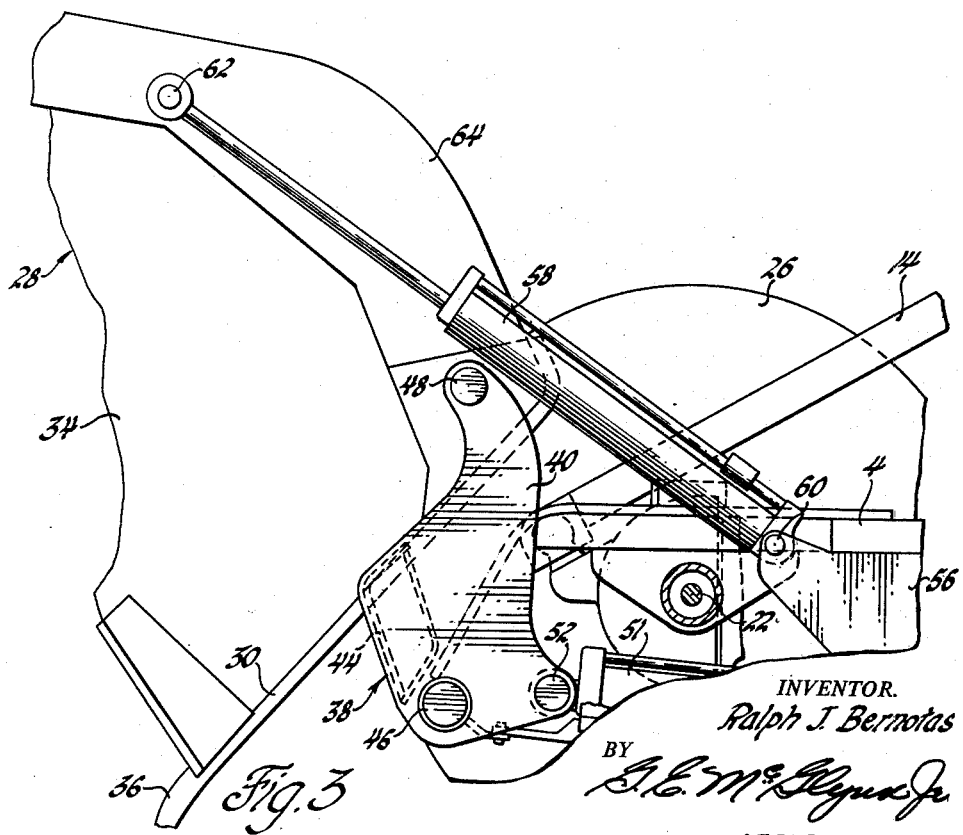
FIGURE 3 is a fragmentary enlarged view of FIGURE 1, but showing the bucket in a dumping position.

Referring now to the operation of the aforedescribed structure, it may be assumed that the respective pairs of cradle operating jacks 51 and bucket tilt jacks 58 are suitably positioned so as to dispose the bucket 28 in the digging position of FIGURE 1 in which the wall 30 is substantially horizontal. After a load has been obtained within the bucket 28, the tilt jacks 58 may be operated to a retracted position to roll the bucket 28 about its pivotal connection 48 to the cradle lever mechanism 38, thereby disposing the bucket in a low level load-retaining position as indicated in FIGURE 2. Thereafter, the cradle jacks 51 may be actuated to a retracted position causing the cradle lever mechanism 38 to swing about the axis of the pivot pins 46 to swing the cradle levers 40 through an arc in excess of 90° to an upright position to dispose the bucket in the cradled position indicated in FIGURE 4 substantially immediately above the front axle 22 and below the line of sight of the vehicle operator. As the cradle lever mechanism 38 is pivoted from the position of FIGURE 2 to that of FIGURE 4, the connections of the tilt jacks 58 to the bucket 28 cause the latter to roll automatically forwardly or counterclockwise in FIGURE 4 about the pivotal connection 48 thereby maintaining the mouth of the bucket in a non-spilling or substantially horizontal attitude with respect to the ground throughout the entire cradling operation. With the bucket disposed in the cradled position of FIGURE 4, the vehicle may then be driven at relatively high speeds over relatively rough terrain such as the floor of a quarry to a location at which it is desired to unload the bucket. At this time, the tilt jacks 58 may be operated or extended as shown in FIGURE 3 to pivot the bucket 28 forwardly about the axis of the connection 48 to the cradle lever mechanism to dump the bucket. As will be obvious, the cradle jacks 51 and bucket tilt jacks 58 may be extended or retracted to various extents relative to each other to assume various other positions as well as those specifically referred to above.

In the interest of providing a complete understanding of the significance of the cradling structure aforedescribed, it may be assumed that a basic vehicle constructed generally to the scale shown in FIGURE 1 has a gross weight empty of 23,000 lbs. distributed with 7500 lbs. on the front axle and 15,500 lbs. on the rear axle. The bucket 28 primarily designed for use with this machine has a capacity of approximately five and one-half to six yards adapted to carry loads in the order of eight and one-half tons.

It may now be assumed that this bucket is loaded with eight and one-half tons or 17,000 lbs., and that the bucket is then moved to the low level load-retaining position of FIGURE 2 in the drawings. The gross vehicle weight loaded now becomes 40,000 lbs. distributed with 33,800 lbs. on the front axle and 6200 lbs. on the rear axle. Thus, the moment of the 17,000 lb. bucket load about the front axle 22 has the effect of lifting the rear portion of the vehicle to reduce its rear axle load by 9300 lbs. which has been transferred to the front axle. The fact that the bucket load has removed 60% of the rear axle load is indicative of the condition of instability in the vehicle, particularly if the latter is used to transport the load over relatively rough haul roads for great distances and at high speeds as well as being subjected to inertia forces caused by side sway of the bucket and swaying in a vertical longitudinal plane occasioned by braking the vehicle. In the interest of safety, a contractor faced with this situation would add a counterweight to the rear of the vehicle to stabilize it. As a result, the additional weight would, under the assumed circumstances, cause the gross vehicle weight to be excessive relative to the capacity of the power plant 18.

Figure 4:
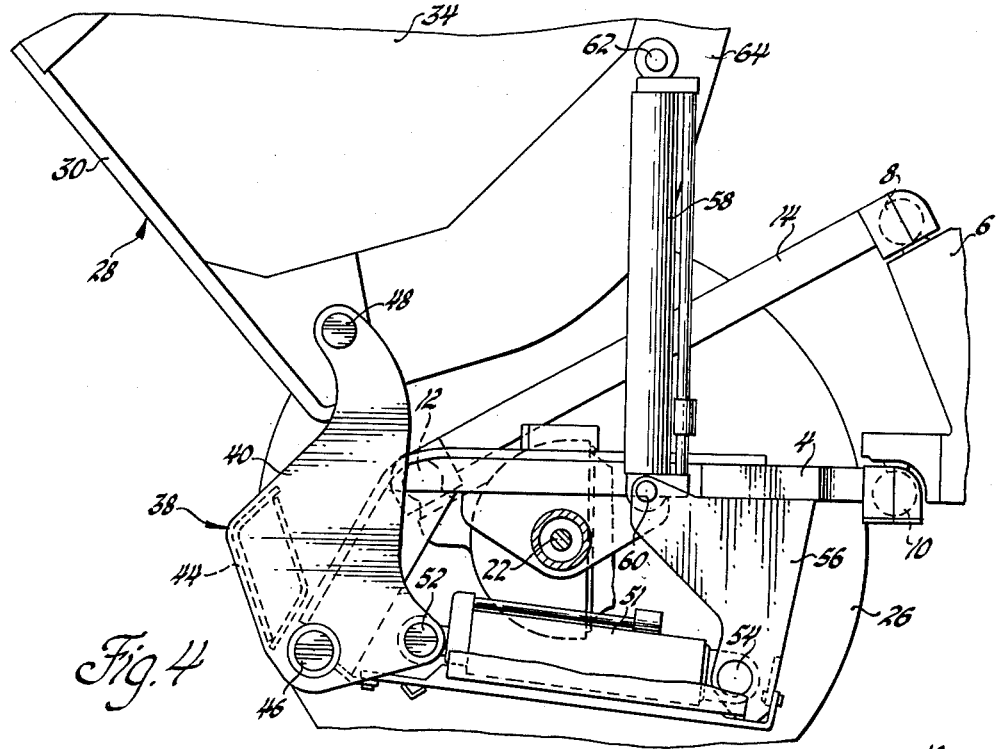
FIGURE 4 is a fragmentary enlarged view of FIGURE 1, but showing the bucket in a cradled position.

However, in a loader vehicle constructed according to the teaching of this invention, the loaded bucket need not be maintained in the position of FIGURE 2 while it is being transported, but may be cradled to the position of FIGURE 4. Upon cradling the load into this position, and again referring to the aforementioned exemplary load figures, the 40,000 lb. load will then be distributed with approximately 14,500 lbs. on the rear axle and 25,500 lbs. on the front axle. By cradling the load, its moment arm about the front axle is reduced substantially as is indicated by the transfer of 8300 lbs. of the 9300 lbs. previously shifted to the front axle back to the rear axle. Thus, when the load is uncradled in the FIGURE 2 position, its gravitational moment has the effect of reducing the original design empty weight rear axle loading to 40% of its value. Conversely, when the load is cradled in the FIGURE 4 position, the rear axle load is approximately 94% of the original design figure for an empty vehicle.

Since the loader construction or cradle lever mechanism 38 contributes a relatively small percentage of the gross vehicle weight empty, it may be considered to be substantially the same for great range of bucket sizes. Therefore, a relatively great range of bucket sizes and associated support linkage therefor may be mounted on a basic vehicle, and cradling of the loaded bucket will result in an extremely significant reduction in its moment arm about the vehicle front axle thereby maintaining substantially the original vehicle stability irrespective of the size of the bucket mounted thereon.

The foregoing load figures have been given with respect to a vehicle at rest and demonstrate the degree to which loads are shifted to the rear axle of the vehicle to stabilize the vehicle. However, there is an equally striking reduction in the amount of rear axle unloading due to the vehicle traversing irregular terrain such as on the floor of a quarry. Thus, it should be noted that the bucket as cradled in FIGURE 4 is carried at a relatively low height adjacent the front axle or fulcrum point, thereby further avoiding the problem of vehicle instability by substantially minimizing the effect of inertia as the vehicle bumps along the ground, is braked, steered or subjected to side-swaying of the bucket, and as compared to conventional structures in which the bucket is carried at a relatively great distance forward of or forward of and above the front axle.

While but one form of the invention has been shown and described, other forms will now be apparent to those skilled in the art. Therefore, the embodiment shown in the drawings is merely for illustrative purposes, and is not intended to limit the scope of the invention which is defined by the claims which follow.

I claim:

1. A vehicle comprising front and rear axles and ground-engaging means mounted thereon, a material handling bucket disposable in a digging position longitudinally beyond one of said axles, a cradling and support mechanism for said bucket comprising cradle lever means pivotally supported on said vehicle and pivotally connected to said bucket longitudinally beyond said one axle with said bucket disposed in said digging position, a first fluid pressure-operated jack pivotally connected to said vehicle and pivotally connected to said bucket and being operable to pivot said bucket about its connection to said cradle lever means from said digging position to a low level load-retaining position longitudinally beyond said one axle, and a second fluid pressure-operated jack pivotally supported on said vehicle and pivotally connected to said cradle lever means and being operable to pivot the latter to a substantially upright position to swing said bucket upwardly and longitudinally from said low level load-retaining position to a cradled position substantially immediately over said one axle.

2. A vehicle comprising front and rear axles and ground-engaging means mounted thereon, a material handling bucket disposable in a digging position longitudinally beyond one of said axles, a cradling and support mechanism for said bucket comprising cradle lever means pivotally supported on said vehicle and pivotally connected to said bucket longitudinally beyond said one axle with said bucket disposed in said digging position, a first fluid pressure-operated jack pivotally connected to said vehicle and pivotally connected to said bucket and being operable to pivot said bucket about its connection to said cradle lever means from said digging position to a low level load-retaining position longitudinally beyond said one axle, and a second fluid pressure-operated jack pivotally supported on said vehicle and pivotally connected to said cradle lever means and being operable to pivot the latter to a substantially upright position to swing said bucket upwardly and longitudinally from said low level load-retaining position to a cradled position substantially immediately over said one axle, said first jack being operable to pivot said bucket automatically relative to said cradle lever means as the latter pivots to said cradled position to maintain said bucket in a non-spilling attitude.

3. A vehicle comprising front and rear axles and ground-engaging means mounted thereon, a material handling bucket disposable in a digging position longitudinally beyond one of said axles, a cradling and support mechanism for said bucket comprising cradle lever means pivotally supported on said vehicle and pivotally connected to said bucket longitudinally beyond said one axle with said bucket disposed in said digging position, a first fluid pressure-operated jack pivotally connected to said vehicle and pivotally connected to said bucket and being operable to pivot said bucket about its connection to said cradle lever means from said digging position to a low level load-retaining position longitudinally beyond said one axle, and a second fluid pressure-operated jack having one end pivotally supported on said vehicle and the other end pivotally connected to said cradle lever means and being operable to pivot the latter to a substantially upright position to swing said bucket upwardly and longitudinally from said low level load-retaining position to a cradled position substantially immediately over said one axle, said first jack being operable to pivot said bucket about said cradle lever means from said cradled position to a dumping position.

4. A vehicle comprising front and rear axles and ground-engaging means mounted thereon, a material handling bucket disposable in a digging position longitudinally beyond one of said axles, a cradling and support mechanism for said bucket comprising cradle lever means pivotally supported on said vehicle and pivotally connected to said bucket longitudinally beyond said one axle with said bucket disposed in said digging position, a first fluid pressure-operated jack pivotally connected to said vehicle and pivotally connected to said bucket and being operable to pivot said bucket about its connection to said cradle lever means from said digging position to a low level load-retaining position longitudinally beyond said one axle, and a second fluid pressure-operated jack having one end pivotally supported on said vehicle and pivotally connected to said cradle lever means and being operable to pivot the latter to a substantially upright position to swing said bucket upwardly and longitudinally from said low level load-retaining position to a cradled position substantially immediately over said one axle, said first jack being operable to pivot said bucket automatically relative to said cradle lever means as the latter pivots to said cradled position to maintain said bucket in a non-spilling attitude, and being operable to pivot said bucket about said cradle lever means from said cradled position to a dumping position.

5. A vehicle comprising front and rear axles and ground-engaging means mounted thereon, a material handling bucket disposable in a digging position longitudinally beyond one of said axles, a cradling and support mechanism for said bucket comprising cradle lever means having an inner end pivotally connected to said vehicle about a fixed axis spaced longitudinally beyond and below said one axle and an outer end pivotally connected to said bucket longitudinally beyond said one axle with said bucket disposed in said digging position, a first fluid pressure-operated jack having one end pivotally connected to said vehicle and the other end pivotally connected to said bucket and being operable to pivot said bucket about its connection to said cradle lever means from said digging position to a low level load-retaining position longitudinally beyond said one axle, and a second fluid pressure-operated jack having one end pivotally connected to said vehicle and the other end pivotally connected to said cradle lever means and being operable to pivot the latter to a substantially upright position to swing said bucket upwardly and longitudinally from said low level load-retaining position to a cradled position substantially immediately over said one axle and substantially below the horizontal line of sight of the vehicle operator, said first jack being operable to pivot said bucket automatically relative to said cradle lever means as the latter pivots to said cradled position to maintain said bucket in a non-spilling attitude, and being operable to pivot said bucket about said cradle lever means from said cradled position to a dumping position.

References Cited in the file of this patent

UNITED STATES PATENTS 2,811,265   Wagner _____ Oct. 29, 1957